Patented Sept. 23, 1930

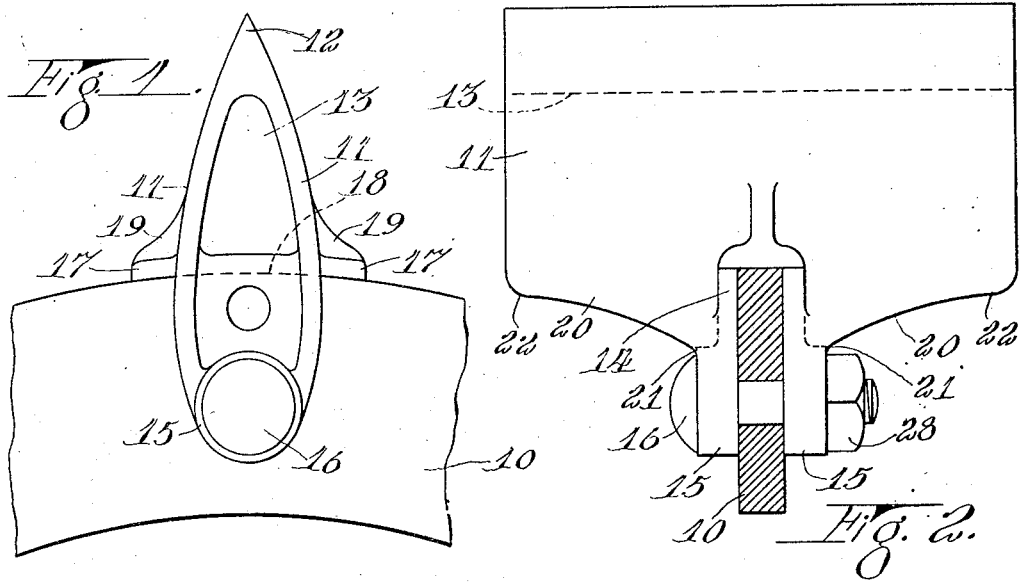
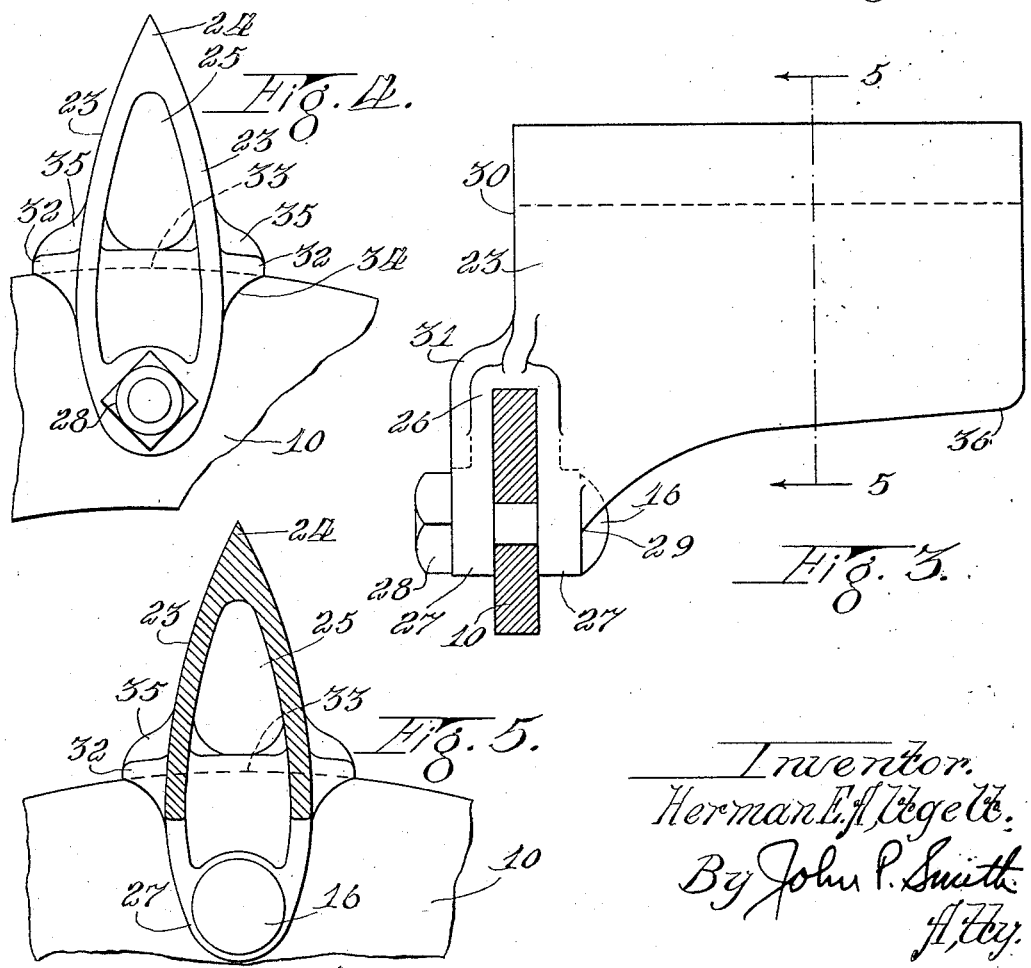

1,776,407

UNITED STATES PATENT OFFICE

HERMAN E. ALTGELT, OF SOUTH BEND, INDIANA, ASSIGNOR TO OLIVER FARM EQUIPMENT COMPANY, A CORPORATION OF DELAWARE

TRACTION-WHEEL LUG

Application filed March 25, 1929. Serial No. 349,550.

The present invention is directed to a novel and improved construction of traction wheel lugs, in which the maximum earth engaging surface is afforded with a minimum amount of material.

One object of the invention is to provide a novel and improved form of an efficient, strong and durable traction wheel lug in which the ground engaging walls thereof are relatively thin, so that material thereof is distributed with respect to the securing portion of the lug, that the ground engaging surface is increased to a maximum with a minimum amount of weight and material.

A further object of the invention is to provide traction wheel lugs which are preferably in the form of a wedge formed by two thin ground engaging walls leaving a transversely extending opening therethrough and having an inverted U-shaped attaching portion formed integrally therewith, which straddles the wheel rim so as to form a maximum ground engaging surface with a minimum amount of weight and material.

These and other objects are accomplished by providing a construction and an arrangement of the parts in the manner hereinafter described and particularly pointed out in the appended claims.

Fig. 1 is a fragmentary side elevational view of a narrow traction wheel rim showing my improved lug mounted thereon.

Fig. 2 is an elevational view of the lug shown in Fig. 1 with the rim of the wheel shown in cross-section.

Fig. 3 is a similar view showing a modified form of lug.

Fig. 4 is a side elevational view of the lug and a fragment of the rim shown in Fig. 3, and Fig. 5 is a cross-sectional view taken on the lines 5—5 of Fig. 3.

The invention in the present instance, is an improvement on an involute form of traction wheel lug described and claimed in my copending application, Ser. No. 269,193, filed April 11, 1928.

In illustrating one form of my invention, I have shown the same in connection with the narrow rimmed traction wheel, a fragmentary portion of which is indicated by the reference character 10. This improved form of lug is extremely light in proportion to its earth engaging surfaces which is not only advantageous in so far as the material in the economy of manufacture is concerned, but also reduces the load which is required to be moved by the tractor, and, therefore, increases the efficiency and tractive power of the tractor as in many instances and under many conditions a great number of these lugs are required so that the necessary traction with the ground can be secured in soft or soggy soil. This lug comprises two involute curved walls 11 which converge together at an apex 12 forming a substantially triangular opening 13 transversely therethrough. These walls 11 form a maximum ground engaging surface with a minimum amount of material required. Formed integrally with both walls 11 and arranged transversely with respect to the transverse opening 13, is an inverted U-shaped attaching portion generally indicated by the reference character 14. This U-shaped portion 14 comprises spaced apart apertured ears 15 through which a bolt 16 extends for securing the lug to the rim 10 of the wheel. Projected outwardly from the outer surfaces of the ground engaging walls 11 are rim engaging projections 17, which are adapted to contact with the periphery of the rim 10 and in arcuate alignment with the curved recess 18 of the U-shaped securing portion 14. These projections 17 are further reinforced by vertically extending ribs 19. The ground engaging surface of the walls 11 extend laterally on the opposite sides of the securing portion 14 of the lug and have their inner ends curved inwardly as shown at 20 and diminish at a point as shown at 21 adjacent the securing portion 16.

It will be noted that the periphery of the rim 10 extends outwardly into the socket or securing means 14 at a point above the lower outer edges as indicated at 22 of the ground engaging surfaces 11 so that with the walls terminating as shown at 21 adjacent the bolt, a relatively strong lug construction is afforded with a minimum amount of material required. And it will also be noted that by providing the laterally extended projections 17 on both walls 11 of the lug so that a relatively large portion of the periphery of the rim is engaged, the lug is fastened to the rim in a steady and secure manner.

In the modified form shown in Figs. 3 to 5, inclusive, I have illustrated the same principles of a lug construction, except that the lug shown herein is provided with an offset securing means fastened on one side thereof whereby the tread of the traction wheels of the tractor may be either increased or diminished, depending on which side of the rim the lug is secured. It will also be noted that the lugs of the type illustrated in the modified form as shown in Figs. 3 to 5 inclusive, may be secured alternately on the opposite sides of the same rim so that the width of the tread of each traction wheel may be increased if so desired.

In this modified form, the lug similarly comprises two involute curved ground engaging surfaces or walls 23 which converge at an apex 24 forming a substantially triangular opening 25 transversely therethrough. Formed integrally with and on one end of the lug is a substantially inverted U-shaped securing portion generally indicated by the reference character 26. This U-shaped securing portion comprises two spaced apart apertured ears 27 through which a bolt 28 extends for securing the lug to the rim 10. The walls 23 forming the ground engaging surface of the lug, are curved downwardly and inwardly to the rim and diminishes at a point, as shown at 29, below the longitudinal center of the bolt and on one side of one of the apertured ears 27. The laterally inner portion of the lug as shown at 30, terminates in a line which forms substantially the longitudinal center of the rim 10. Each of the walls 23 is reinforced to the securing U-shaped portion 25 by curved ribs 31 so as to reinforce the inner ear 27. Extending laterally from each of the walls 23 and at the inner end thereof, is an outwardly extending projection 32 which has its inner surface in arcuate alignment with the curved surface 33 of the inverted U-shaped portion 26 so as to properly seat itself on the periphery of the rim of the wheel. These lateral projections 32 are further reinforced by inwardly extending curved ribs 34 and top ribs 35. It will be noted by referring to Fig. 3 of the drawings, that the outer lower end as indicated at 36 of each of the ground engaging walls 33 extends to a point below the outer periphery of the rim 10.

By the above construction, it will be seen that I have provided novel and improved traction wheel lugs which are extremely light in proportion to their earth engaging surfaces and which in addition to economizing in material in the manufacture thereof, also reduce the load which the wheels must necessarily carry and, therefore, increase the efficiency and tractive power of the tractor.

While in the above specification, I have described two embodiments which my invention may assume in practise, it will, of course, be understood that the same is capable of other modifications and that modifications may be made without departing from the spirit and scope of my invention as expressed in the following claims.

What I claim as my invention and desire to secure by Letters Patent is:

1. A traction wheel lug comprising relatively large ground engaging surfaces consisting of two oppositely and relatively thin converging walls forming an apex at the outer extremity thereof, said walls so arranged as to form a substantially large opening therebetween, and inwardly extending U-shaped portion formed integrally with said walls and arranged substantially transversely with respect to the general surface of said walls and projections formed integrally with and extending laterally from said walls and adapted to engage the periphery of the rim for steadying said lug on the rim of the traction wheel.

2. A traction wheel lug comprising two relatively thin and oppositely arranged converging walls forming an apex at their outer end, a U-shaped securing portion formed integrally with said walls and arranged substantially transversely with respect to the general surface of said curved walls for forming a recess for the reception of the rim of the traction wheel, oppositely extending projections formed integrally on the outer sides of said walls and forming an arcuate extension of the recess formed by said securing means for securely steadying said lug to a traction wheel.

3. A traction wheel lugs comprising two relatively thin and oppositely arranged converging walls forming an apex at the outer extremity thereof and so arranged with respect to each other to form a substantially large transverse opening therebetween, an inverted U-shaped securing portion formed integrally with said walls and arranged with respect thereto so that the major portion of the ground engaging surface of said lug extends outwardly beyond said securing portion and laterally extending projections formed on the outside of said walls and engageable with the periphery of said rim for rigidly securing said lug to said rim.

In testimony whereof I have signed my name to this specification, on this 20th day of March, A. D. 1929.

HERMAN E. ALTGELT.